United States Patent [19] [11] 4,389,180
Gordon [45] Jun. 21, 1983

[54] MANDREL WITH IDENTICAL EXPANDING SEGMENTS

[76] Inventor: John H. Gordon, 855 Brandywine Rd., Downingtown, Pa. 19335

[21] Appl. No.: 277,279

[22] Filed: Jun. 25, 1981

[51] Int. Cl.³ .................. B29C 17/00; B29D 23/00
[52] U.S. Cl. .................................. 425/403; 425/393; 425/425; 425/DIG. 218; 249/181; 249/184
[58] Field of Search ............... 425/393, 403; 249/181, 249/182, DIG. 218

[56] References Cited

U.S. PATENT DOCUMENTS

| | | | |
|---|---|---|---|
| 2,807,071 | 9/1957 | Francis et al. | 249/181 |
| 3,210,039 | 10/1965 | Long | 249/181 |
| 3,990,673 | 11/1976 | Jones et al. | 249/181 X |
| 4,238,180 | 12/1980 | Gordon et al. | 425/393 X |

Primary Examiner—J. Howard Flint, Jr.
Attorney, Agent, or Firm—Weiser, Stapler & Spivak

[57] ABSTRACT

A mandrel for forming a bell shape and an annular groove in the bell in one end of a plastic pipe which comprises a shaped profile and a plurality of identically formed segments which are movable relative to the profile. The segments are radially urged in identical radial paths from an initial position which is inwardly of the bell shaped profile to an expanded position wherein the segments cooperate and interact to form an expanded ring of diameter greater than the pipe bell, thereby to impress a circular groove therein. An actuating shaft rotatively reciprocates a pair of actuating plates to radially reciprocate the plurality of segments simultaneously between their initial positions and expanded positions. The segments each include link pairs in pivoted engagement with the actuating plates and keys which respectively ride within guide slots to radially guide the segments between their initial positions and expanded positions upon rotative reciprocation of the actuating plates.

5 Claims, 6 Drawing Figures

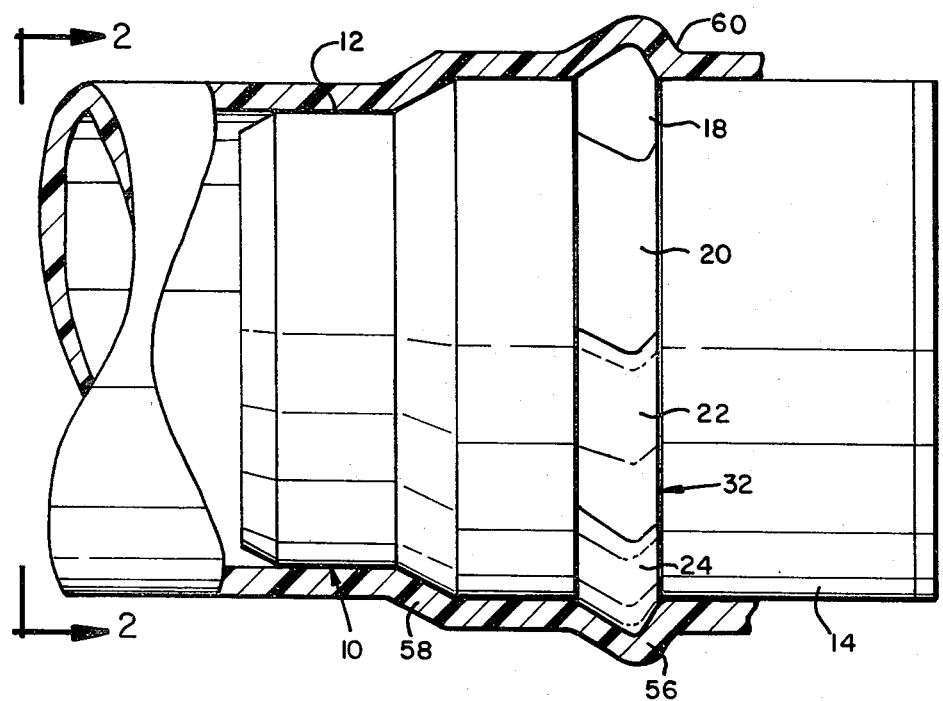
FIG. 1
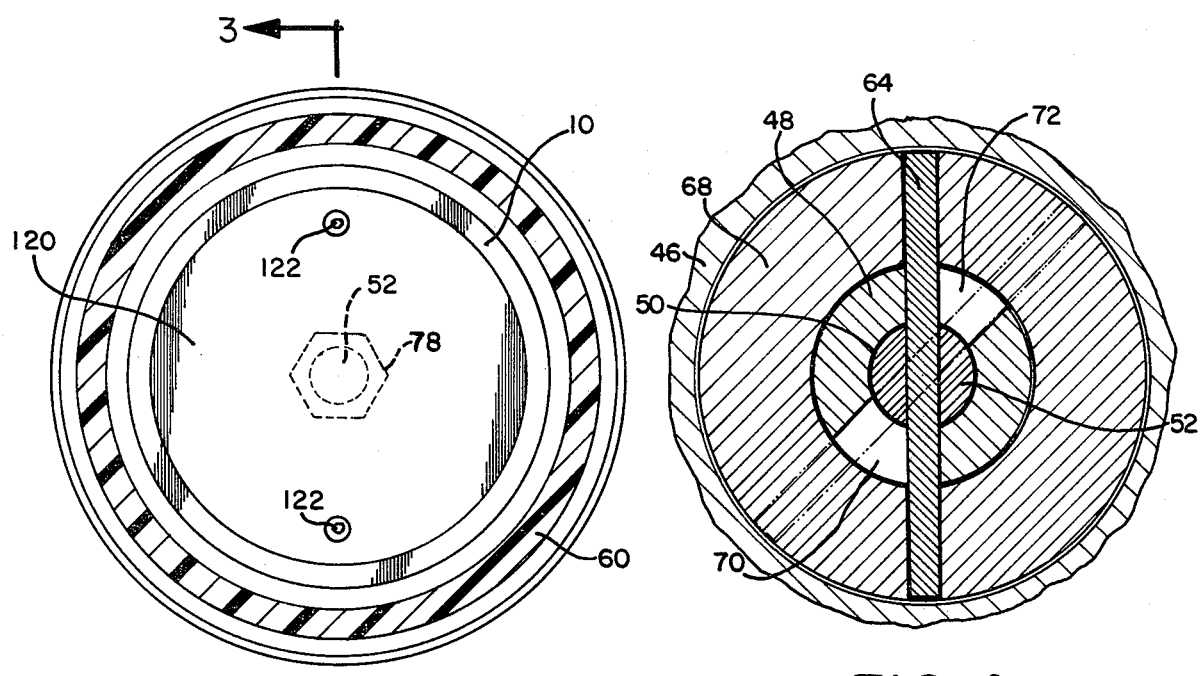
FIG. 2
FIG. 4

MANDREL WITH IDENTICAL EXPANDING SEGMENTS

BACKGROUND OF THE INVENTION

The present invention relates generally to the art of forming bells on plastic pipes, and more particularly, is directed to an apparatus suitable to form an internal groove simultaneously with the belling of the pipe.

It is the usual practice to extrude plastic pipes in elongate configuration of desired diameter and then to cut the extruded product into individual lengths of convenient size suitable for handling, shipping and installing, for example twenty foot lengths. As each length of pipe is cut, it is presently the practice to enlarge or "bell" one end sufficiently to join adjacent pipe sections by receiving an unenlarged end of another similar length of pipe therein. The inside diameter of the bell is formed sufficiently large to receive easily one end of the next adjacent section of pipe with sufficient clearance to allow the application of packing, sealing materials, gaskets or other materials designed to prevent leakage at the pipe joints when the pipe lengths are joined to form a pipe line. In many applications, the seal between adjacent lengths of pipe is provided by expanding an internal groove in the bell of suitable configuration and design to seat therein an annular, resilient gasket to permit a leak proof pipe joint to be easily and rapidly made in the field.

It is usual to employ a single mandrel construction both to form the shaped bell, and at the same time, to simultaneously also form the expanded groove for receipt therein of the annular gasket. U.S. Pat. No. 4,238,180 entitled "Mandrel with Identical Expanding Segments", which is commonly assigned to the assignee of the present application, is exemplary of prior art belling machines including the capability of simultaneously forming a pipe bell including an integral gasket receiving groove.

SUMMARY OF THE INVENTION

The present invention is directed generally to a device suitable for forming bells at one end of a length of plastic pipe, and more particularly, is directed to a mandrel including a plurality of identical, cooperating, expanding segments for forming an annular groove in the pipe bell as the bell itself is being formed.

In the apparatus of the present invention, an actuating shaft is axially positioned and is rotatively reciprocated through an angle of approximately forty-five degrees relative to a stationary mandrel nose. The shaft simultaneously rotates a pair of spaced pins, which pins are respectively secured to first and second axially spaced actuating plates in a manner to also rotatively reciprocate the actuating plates. Each of the actuating plates is formed to provide a plurality of similar guide grooves to guide a plurality of link connecting rollers between respective first and second positions.

A plurality of indentical, cooperating, groove forming segments are simultaneously radially reciprocal along respective guide pins between a first radially inward position to a second radially outward position. Each segment is radially actuated by a pair of pivotal links, the pivotal links being interconnected by pivot pins equipped with rollers which ride within the respective guide grooves in the first and second actuating plates. Accordingly, as the actuating plates are rotatively reciprocated through forty-five degrees upon rotative reciprocation of the actuating shaft, the interaction of the link pivot pin rollers within the guide grooves of the first and second actuating plates causes the plurality of similar segments to reciprocate radially between their first, retracted positions to their second, expanded positions.

Each of the groove forming segments is identically formed and comprises a radially inwardly facing base which is pivotally affixed to one of the said links. An elongated, radially aligned groove or slot is provided to guide the segment along a radially aligned path as the segment is moved between its first and second positions, when the actuating plates are rotatively reciprocated. The base terminates outwardly in flat face or slide that is formed at an angle from the tangent to the groove diameter that is defined when the segments are urged to their second expanded positions, for example, an angle of twenty-two and one-half degrees.

The segments each include an integral, curved, extension foot having an outer surface curved to define an arch or portion of the circumference of the annular groove. Accordingly, if eight similar segments are employed in the apparatus, the arcuate length of the outer surface of the extension foot of each segment will be equal to one-eighth of circumference of the groove. The trailing edge of the arc portion of each extension foot is radially inwardly shaped to provide a cooperating flat surface or slide surface positioned at an angle of twenty-two and a half degrees from the tangent to the groove diameter circle, whereby the flat, angled slide surface of the extension foot of one segment touches and slides relative to the angled, flat base surface of the next adjacent segment as the segments are reciprocated between their first, radial inward positions and their second, expanded, groove forming positions.

The plurality of similar segments are radially reciprocated in unison upon rotative reciprocation of the first and second activating plates in a manner whereby the extension foot flat face or slide of one segment touches and slides upon the base flat face or slide of the next adjacent segment during all radial movements of the segments. When the segments are reciprocated to the respective second, outermost positions, it is the essence of this invention that the circular arc portions of each segment extension foot will circularly align to form a smooth, continuous expanded circle to press and form the desired annular groove into the bell end of the pipe as the bell itself is being formed by the same mandrel.

In accordance with usual practice, the end of the plastic pipe to be belled is initially suitably heated or otherwise treated to facilitate impressing the bell shape upon the end of the pipe. The pipe end, after being heated, is rendered sufficiently pliable to enable the mandrel both to impress the bell shape and, upon radial expansion of the segments, also to impress the internal, annular groove. When the plurality of cooperating segments are radially inwardly withdrawn and the shaped bell is sufficiently cooled, the pipe can be withdrawn from the mandrel with the impressed shapes set therein. An O-ring gasket or other shaped sealing member or gasket can manually or automatically be applied within the annular groove to thereby make up a complete bell end ready for joining in a sealed, field connection.

It is therefore an object of the present invention to provide an improved mandrel capable of forming an internal groove in a belled end of a pipe of the type set forth.

It it another object of the present invention to provide a novel mandrel with a plurality of identical reciprocating segments suitable to form an annular groove in a pipe bell.

It is another object of the present invention to provide a novel mandrel with identical segment means reciprocal relative to the mandrel nose including rotative reciprocating means to cause radial reciprocation of the segments.

It is another object of the present invention to provide a novel mandrel with identical expanding segments which are simultaneously expandable and contractable for producing an outwardly formed annular groove in a plastic pipe bell end.

It is another object of the present invention to provide a novel mandrel with indentical expanding segments with means to radially reciprocate the segments from a first, contracted position to a second, expanded position and means to reinforce the segments when in the expanded position.

It is another object of the present invention to provide a novel mandrel with identical expanding segments including link means connected to each segment, actuating plate means to pivot the link means between a first pivoted position to a second, radially aligned position and rotatively reciprocal means to rotatively reciprocate the actuating plate means.

It is another object of the present invention to provide a novel mandrel with identical expanding segments that is simple in design, rugged in construction and highly efficient when in use.

Other objects and a fuller understanding of the invention will be had by referring to the following description and claims of a preferred embodiment, taken in conjunction with the accompanying drawings wherein like reference characters refer to similar parts throughout the several views and in which:

BRIEF DESCRIPTION OF THE DRAWINGS

FIG. 1 is a side elevational view, partly broken away, showing a mandrel in use to form a bell with intergral annular groove in the end of a length of plastic pipe.

FIG. 2 is an end elevational view of the mandrel looking from line 2—2 on FIG. 1.

FIG. 4 is a cross-sectional view taken along line 4—4 on FIG. 3, looking in the direction of the arrows.

DESCRIPTION OF THE PREFERRED EMBODIMENT OF THE INVENTION

Figure 3:
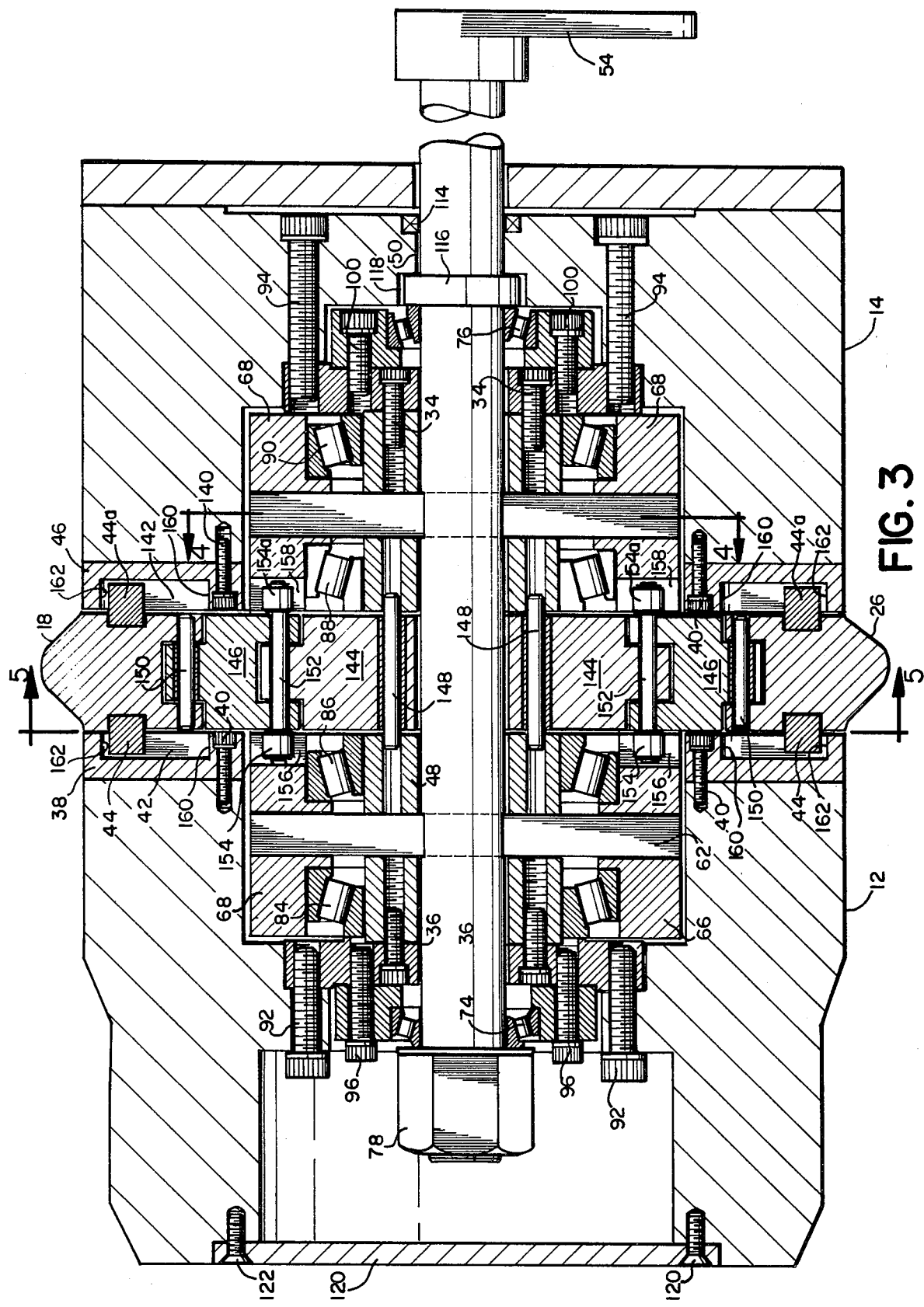
FIG. 3 is an enlarged, cross-sectional view taken along line 3—3 on FIG. 2, looking in the direction of the arrows.

Although specific terms are used in the following description for the sake of clarity, these terms are intended to refer only to the particular structure of the invention selected for illustration in the drawings, and are not intended to define or limit the scope of the invention.

Figure 5:
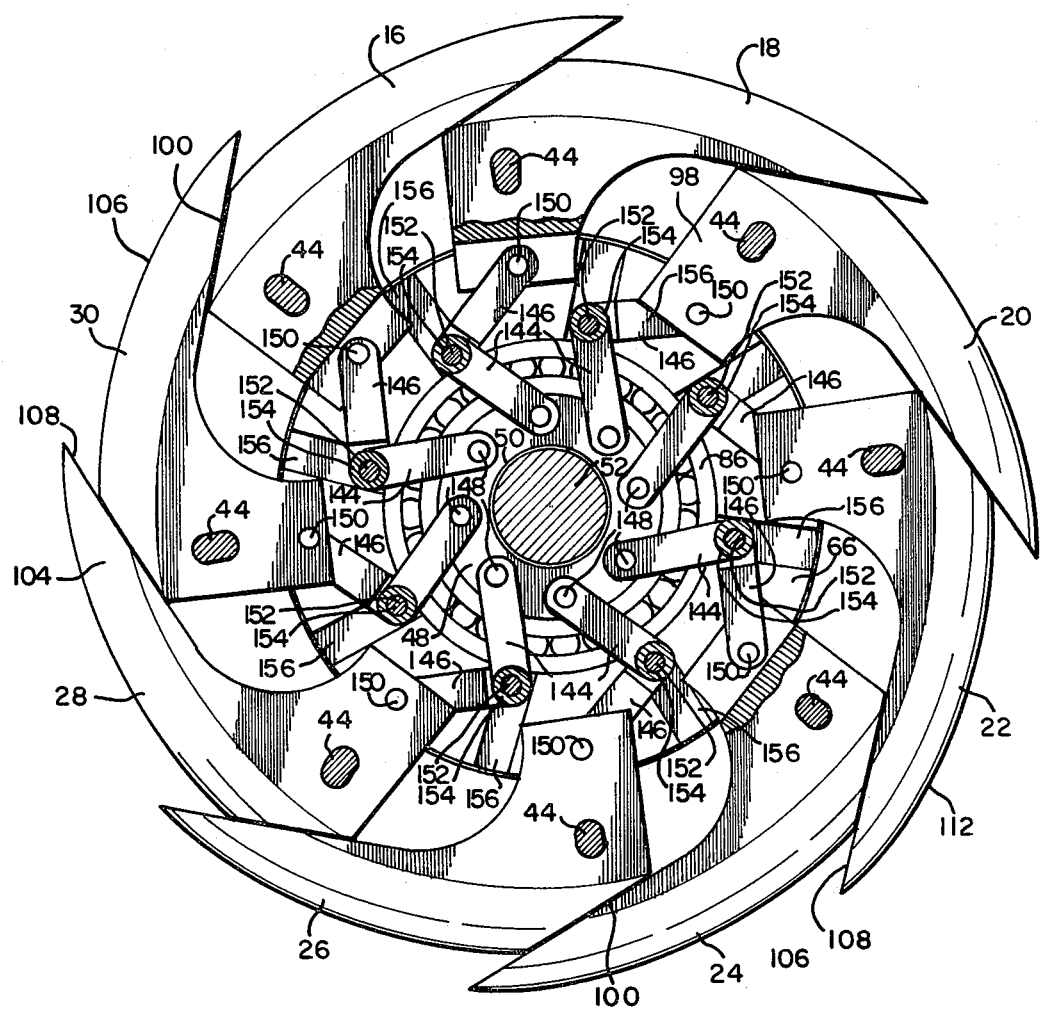
FIG. 5 is an enlarged, cross-sectional view taken along line 5—5 on FIG. 3, looking in the direction of the arrows, partly broken away and showing the segments in a first, radially inward position.
Figure 6:
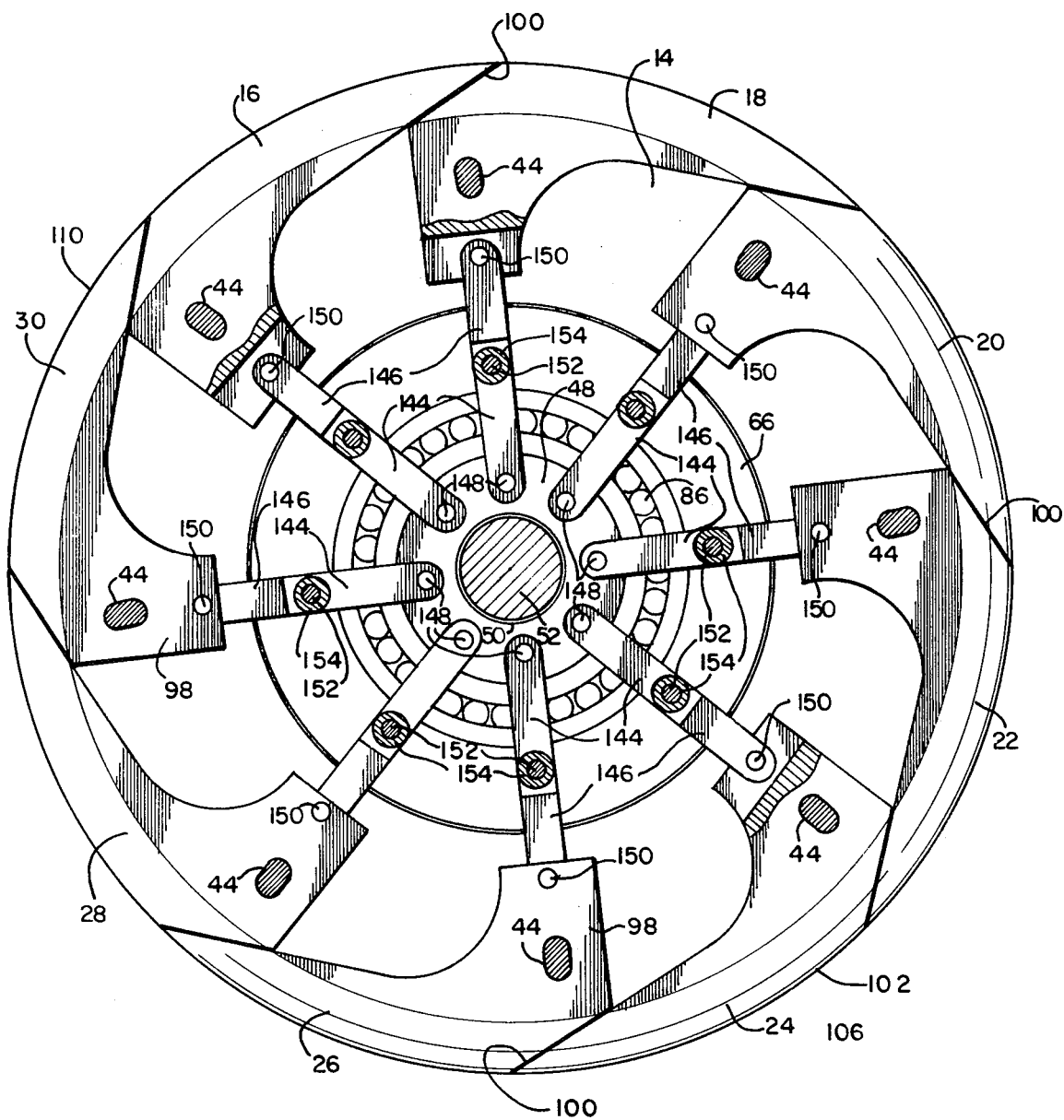
FIG. 6 is an enlarged, cross sectional view similar to FIG. 5 showing the segments in a second, radially outward position.

Referring now to the drawings, there is shown in FIGS. 1 and 2 a mandrel 10 which comprises generally a forward, shaped nose means or profile 12, a rearward body means 14 and a plurality of segment means 32, comprising identical, expanding segments 16, 18, 20, 22, 24, 26, 28, and 30. As indicated, the expanding segments 16–30 are positioned intermediate the profile 12 and the mandrel body 14, are aligned in a plane positioned at ninety degrees to the axis through the profile and the mandrel body and are each radially reciprocal from a first, radial inward position as illustrated in FIG. 5 to a second, radially outward position as shown in FIG. 6, in the manner hereinafter more fully set forth.

Referring now to FIG. 3, an actuating shaft 52 is axially aligned through the front profile 12 and the rear body 14, and is rotatively reciprocal within the axial bore 50 through an angle of approximately forty-five to fifty degrees by a crank 54 or other suitable, known mechanism (not illustrated) to expand the segments 16–30 from their respective first radially inward positions (FIG. 5) to their respective second expanded positions (see FIG. 6) for forming an internal, annular, shaped groove 56 in the bell end 58 of a plastic pipe 60. A pair of spaced, long keys or pins 62, 64 (FIG. 3) are secured in the actuating shaft 52 and are rotatively turned thereby to rotatively reciprocate the activating plates 66, 68 as hereinafter more fully set forth. A central hub 48 is fixedly secured by suitable bolts and is provided with a pair of diametrically opposed, acurate openings 70, 72 (FIG. 4) to permit the keys 62, 64 to rotatively reciprocate through an angle of approximately forty-five to fifty degrees relative to the stationary hub 48. Accordingly, as the actuating shaft 52 is rotatively reciprocated by the crank 54 which is reciprocated by associated mechanism of suitable, known type (not shown), the long keys or pins 62, 64 will also rotatively reciprocate relative to the hub 48 which remains stationary. Front and rear bearings 74, 76 are provided in known manner to facilitate rotation of the shaft 52 relative to the mandrel nose 12 and the body 14. A nut 78 conventionally secures the forward end of the shaft 52 at the front bearing 74 to hold the parts in operating arrangement.

The long keys 62, 64 are seated within the front and rear actuating plates 66, 68 for reciprocation thereof when the actuating shaft 52 is rotatively reciprocated. The front actuating plate 66 is rotatively carried relative to the stationary hub 48 by the front and rear bearings 84, 86. Similarly, the actuating plate 68 is rotatively carried relative to the stationary hub 48 by its associated front and rear bearings 88, 90. Still referring to FIG. 3, the nose or profile 12 of the mandrel 10 is secured in stationary relationship to the hub 48 by the plurality of machine bolts 92. The body 14 is maintained in stationary relationship to the stationary hub 48 by the plurality of rear machine bolts 94. The plurality of machine bolts 96 secure the front bearing 76 in position. Accordingly, as the activating shaft 52 is rotatively reciprocated by the crank 54, the nose or profile 12, the body 14, the front bearing 74, the rear bearing 76 and the hub 48 all remain stationary. The long keys 62, 64 are rotated by the shaft 52 and in turn rotatively reciprocate in unison the respective, associated front actuating plate 66 and rear actuating plate 68.

A front annular insert 38 is secured in stationary relationship to the shaped profile 12 by a plurality of circularly spaced machine bolts 40. The front insert is machined, drilled, or otherwise treated in known manner to include a plurality of radially aligned slots or keyways 42, one for each of the segments 16–30. Each segment is equipped with a projecting key or pin 44 which is positioned within a keyway 42 to provide a guide to assure only radial movement for the segments 16–30 as they are reciprocated between their respective inward positions (FIG. 5) and their respective radially outward positions (FIG. 6). Similarly a rear annular insert 46 is secured to the mandrel body means 14 by a plurality of circularly spaced machine bolts 140. The rear insert 46 includes a plurality of radially aligned slots or keyways 142, one for each of the segments 16–30. As illustrated, the respective front and rear keyways 42, 142 longitudinally align to simultaneously receive and guide the forward and rearward keys 44, 44a of each segment 16–30.

Referring now to FIGS. 3, 5 and 6 each segment 16–30 is radially reciprocated respectively by a pair of pivotally interconnected inner and outer links 144, 146. Each inner link 144 is pivotally connected at its inner end to the stationary hub 48 through a pivot pin 148 and is freely pivoted thereabout. Each outer link is pivotally connected at its outer end to one of the segments 16–30 through an outer pivot pin 150 and is freely pivotal thereabout. The links 144, 146 are pivotally interconnected by actuating pivot pins 152, which pins extend forwardly and rearwardly of the links 144, 146 and respectively carry forward and rearward rollers or followers 154, 154a. As illustrated, each of the actuating plates 66, 68 is provided with a shaped guide or slot 156, 158 within which slots the front and rear rollers 154, 154a are respectively positioned for segment reciprocation as the actuating plates 66, 68 are rotatively reciprocated.

An oil seal 114 may be conventionally applied to prevent leakage between the shaft 52 and the body 14. A collar 116 is affixed to the shaft 52 and turns within a suitably configured recess 118, and in cooperation with the rear bearing 76, the front bearing 74 and the nut 78, functions to maintain the longitudinal alignment of the shaft 52 relative to the mandrel nose 12 and the body means 14. A front cover 120 may be secured to the front of the nose 12 by a plurality of machine screws 122 to provide front closure. If desired, a seal, such as an O-ring gasket (not shown) can be employed in conjunction with the cover 120 to provide a front seal.

The guides or slots 156 and 158 cooperate and are suitably positioned and configured to guide the front and rear followers 154, 154a as necessary to radially reciprocate the plurality of expanding segments 16–30 upon rotative reciprocation of the actuating shaft 52. While the invention has been illustrated and described with a plurality of eight expanding segments 16–30 and eight corresponding pairs of guides 156 and 158 in the respective actuating plates 66, 68, it will be appreciated that it may be possible to design a similar, annular groove forming system using either more or fewer expanding segments. Accordingly, the eight segments shown and described should be considered as illustrative only and not necessarily limiting.

The respective radial distances from the longitudinal axis of the shaft 52 between the respective inward termini 160 and the respective outward termini 162 of the slots formed in the cam plate 68 defines the radial limits of travel of the expanding segments 16–30. As the circular plates 66, 68 are rotated in unison, the respective slots or guides 156, 158 are also simultaneously rotated to radially, cooperatively reciprocate the plurality of the expanding segments 16–30 by guiding the respective actuating pivot pins 152 through the forward and rearward rollers 154, 154a to pivot the respective, interconnected links 144, 146.

As best seen in FIGS. 5 and 6 each of the segments 16–30 is similarly formed and each comprises generally a base 98, which base is provided with a suitable opening of size to receive therewithin respectively one of the segment pivot pins 150 to permit an outer link 146 to pivot relative to its connected segment. This construction is designed to facilitate radial reciprocation of the segments 16–30 as the actuating plates 66, 68 are rotatively reciprocated upon the imposition of reciprocal circular forces applied by the actuating shaft 52. Each base 200 terminates radially outwardly in an angled straight slide surface 100 which surface in the embodiment shown, slopes inwardly at an angle of twenty-two and one-half degrees from the tangent to the outer circle 102 defined by the segments 16–30 when in their expanded positions. Each base extends circumferentially in an integral press leg 104. The press legs 104 are each formed to provide an outer arcuate surface which extends circumferentially from the outer limit of each respective slide surface 100 in an arc 106 representing one-eighth of the circumference of the outer circle 102 defined by the segments 16–30 when reciprocated to their expanded positions (FIG. 6). When all of the segments 16–30 are urged outwardly to their expanded positions, all of the outer surfaces or arcs 106 of the individual segment press legs 104 circularly align to define the smooth, continuous, complete outer circle 102. In the expanded position illustrated in FIG. 6, the segments 16–30 circularly align to thereby impress a complete, smooth, internal, annular groove 56 in the pipe bell end 58 as illustrated in FIG. 1.

Each press leg 104 terminates in a cooperating angled, straight slide surface 108, which slide surface 108 faces inwardly and slides upon the first slide surface 100 of the next adjacent segment base 98 as the plurality of segments are radially reciprocated. Still referring to FIGS. 5 and 6, it will be observed that the respective straight, slide surfaces 100, 108 slide upon each other in angular sliding contact as the segments 16–30 are radially reciprocated between their respective retracted positions 112 and their respective expanded positions 110. In this manner, the outer circular arcs 106 of each of the expanding segments 16–30 combine to form a continuous outer circle 102 when the segments are reciprocated radially outwardly to their respective expanded positions 110 for annular groove forming purposes (FIGS. 1 and 6). It will also be noted in FIG. 6, that when the segments 16–30 are reciprocated radially outwardly to their expanded positions 110, adjacent segments overlap and reinforce each other whereby the base 98 of one segment radially inwardly registers with and supports the press leg 104 of the next adjacent segment.

In order to use the belling machine of the present invention, the plastic pipe 60 is first heated in accordance with well known practice to soften the plastic material sufficiently to permit formation both of the bell end 58 and the internal annular groove 56 by utilizing the nose 12, the body means 14 and the plurality of expanding segments 16–30 of the mandrel 10. As the heated end of the plastic pipe is applied over the mandrel profile 12 and body means 14, the segments 16–30 are retracted to their said retracted positions of FIG. 5. After the pipe end to be belled is fully seated upon the mandrel, the crank 54 is functioned to rotate the shaft 52 to urge the segments 16–30 to their respective expanded positions as in FIG. 6, thereby forming the desired annular groove 56. The belled end 58 is then cooled sufficiently in suitable manner well known to those skilled in the trade to harden the plastic material to set the impressed shapes in the belled pipe end. After sufficiently cooling to set the impressed shapes, the crank 54 is rotatively moved to reversely rotate the shaft 52, thereby urging the segments 16–30 to their initial, retracted positions (FIG. 5). When the segments are in their respective retracted positions, the belled and grooved pipe end 58 can be withdrawn from the mandrel 10, and the mandrel is again ready to receive a heat softened, unbelled end of the next length of pipe to repeat the process.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A machine for providing a bell with an annular groove in an end of a plastic pipe comprising
    nose means and body means shaped to form the configuration of the bell,
        said nose means and said body means being non-rotative,
        said nose means and said body means defining an operating opening therebetween;
    a plurality of identical segment means circularly arranged in the said opening to impress an annular groove in the bell,
        said segment means each being equally radially reciprocal between respective retracted positions and respective expanded positions;
    an axially aligned shaft through the nose means the body means and the circle defined by the segment means, the shaft being adapted for rotative reciprocation relative to the nose means and the body means;
    link means pivotally connected to at least some of said segment means to reciprocate the segment means radially outward of the shaft,
        the link means comprising pairs of interconnected inner links and outer links, each outer link being pivotally connected to one of the segment means,
        the pairs of links being interconnected by actuating pivot pins, the said pins extending both forwardly and rearwardly of the interconnected links to provide forward and rearward pin extensions, and
        followers secured to the actuating pivot pins at the said forward and rearward pin extensions; and
    actuating plate means rotatively reciprocated by the shaft, said activating plate means being adapted to pivot the link means radially to reciprocate simultaneously the segment means upon rotative reciprocation of the shaft,
        the activating plate means comprising forward and rearward shaped slots, the said followers being positioned within the slots to pivotally move the pairs of links upon circular reciprocation of the actuating plate means.

2. The machine of claim 1 and a stationary hub overfitting the shaft, the hub being in stationary relationship to the nose means and the body means, the hub comprising a plurality of circumferentially spaced, axially extending pivot pins.

3. The machine of claim 2 wherein all of the inner links are pivotally interconnected to the hub.

4. The machine of claim 2 wherein each of the inner links respectively pivotally connects to one of said pivot pins and is adapted for rotation about the pivot pin when the actuating plate means is rotatively reciprocated.

5. The machine of claim 1 and a plurality of radially aligned keyways in the nose means and in the body means, front and rear keys projecting from each outer link, each key being positioned within a keyway, each keyway extending radially from an inward terminus to an outward terminus, wherein the radial distance between the keyway inward terminus and outward terminus is equal to radial distance of movement of a segment from its retracted position to its expanded position.

* * * * *